US012414099B2

(12) United States Patent
Pefkianakis et al.

(10) Patent No.: US 12,414,099 B2
(45) Date of Patent: Sep. 9, 2025

(54) SENSOR-ASSISTED MILLIMETER-WAVE BEAM MANAGEMENT

(71) Applicant: Apple Inc., Cupertino, CA (US)

(72) Inventors: Ioannis Pefkianakis, San Jose, CA (US); Zhenglian Cai, Cupertino, CA (US); Prashant H. Vashi, San Jose, CA (US); Guillaume Monghal, San Diego, CA (US)

(73) Assignee: Apple Inc., Cupertino, CA (US)

( * ) Notice: Subject to any disclaimer, the term of this patent is extended or adjusted under 35 U.S.C. 154(b) by 581 days.

(21) Appl. No.: 17/848,964

(22) Filed: Jun. 24, 2022

(65) Prior Publication Data

US 2023/0044590 A1 Feb. 9, 2023

Related U.S. Application Data

(60) Provisional application No. 63/227,916, filed on Jul. 30, 2021.

(51) Int. Cl.
*H04W 72/044* (2023.01)
*H04W 72/02* (2009.01)
*H04W 76/19* (2018.01)

(52) U.S. Cl.
CPC ........ *H04W 72/046* (2013.01); *H04W 72/02* (2013.01); *H04W 76/19* (2018.02)

(58) Field of Classification Search
CPC ... H04W 72/046; H04W 72/02; H04W 76/19; H04W 24/04; H04W 88/02; H04B 7/088; H04B 7/0695; H04B 7/0408; H04B 7/0617; H04B 17/309; G06N 20/00

See application file for complete search history.

(56) References Cited

U.S. PATENT DOCUMENTS

| 8,526,961 | B2 | 9/2013 | Sanders et al. |
| 10,004,076 | B1* | 6/2018 | Griesdorf ............. H04W 64/00 |
| 10,243,276 | B2 | 3/2019 | Ford et al. |
| 10,459,074 | B1 | 10/2019 | Omer et al. |
| 10,849,034 | B1 | 11/2020 | Chisu et al. |
| 11,239,981 | B2 | 2/2022 | Zhang et al. |

(Continued)

FOREIGN PATENT DOCUMENTS

| CN | 107919901 | 4/2018 |
| CN | 108702180 | 10/2018 |

(Continued)

OTHER PUBLICATIONS

Partial European Search Report in European Appln. No. 22181998.0, dated Dec. 16, 2022, 17 pages.

(Continued)

*Primary Examiner* — Habte Mered
(74) *Attorney, Agent, or Firm* — Fish & Richardson P.C.

(57) ABSTRACT

This application describes systems and processes for sensor-assisted antenna and beam selection for wireless networks. The systems and processes are configured to detect out of coverage (OoC) scenarios and perform beam management in response to detecting the OoC scenario. The systems and methods are configured to perform beam management during baseband interruption scenarios. In each scenario, the device (e.g., user equipment UE) is configured to determine whether the UE is static or mobile.

13 Claims, 8 Drawing Sheets

(56) References Cited

U.S. PATENT DOCUMENTS

| | | | |
|---|---|---|---|
| 11,463,980 B2 | 10/2022 | Shi et al. | |
| 11,575,452 B2 | 2/2023 | Merlin et al. | |
| 11,672,042 B2 | 6/2023 | Jia et al. | |
| 2016/0119926 A1 | 4/2016 | Sahara et al. | |
| 2018/0227771 A1 | 8/2018 | Malik et al. | |
| 2018/0368142 A1 | 12/2018 | Liou | |
| 2019/0150133 A1* | 5/2019 | Li | H04B 7/06952 |
| | | | 375/224 |
| 2019/0166615 A1 | 5/2019 | Nimbalker et al. | |
| 2019/0182007 A1* | 6/2019 | Liu | H04L 5/0048 |
| 2019/0238208 A1 | 8/2019 | Tang et al. | |
| 2019/0239135 A1 | 8/2019 | Levitsky et al. | |
| 2019/0260501 A1 | 8/2019 | Kim et al. | |
| 2020/0059275 A1 | 2/2020 | Kato et al. | |
| 2020/0119893 A1 | 4/2020 | Zhang et al. | |
| 2020/0241306 A1* | 7/2020 | Elaan | H01Q 21/293 |
| 2020/0322812 A1* | 10/2020 | Shi | H04W 16/28 |
| 2020/0382189 A1 | 12/2020 | Chen et al. | |
| 2020/0404644 A1* | 12/2020 | Zhu | H04W 72/046 |
| 2021/0320747 A1 | 10/2021 | Yoshioka et al. | |
| 2022/0022231 A1 | 1/2022 | Huang et al. | |
| 2022/0095195 A1 | 3/2022 | Ning et al. | |
| 2022/0225118 A1 | 7/2022 | Pefkianakis et al. | |
| 2022/0247477 A1* | 8/2022 | Ryu | H04B 7/06952 |
| 2022/0385419 A1 | 12/2022 | Paz et al. | |
| 2023/0035996 A1 | 2/2023 | Pefkianakis et al. | |
| 2023/0092094 A1* | 3/2023 | Ryu | H04B 7/06 |
| | | | 375/267 |
| 2023/0318686 A1 | 10/2023 | Kwak et al. | |
| 2023/0388089 A1 | 11/2023 | Kwak et al. | |

FOREIGN PATENT DOCUMENTS

| | | |
|---|---|---|
| CN | 110214424 | 9/2019 |
| CN | 110875770 | 3/2020 |
| CN | 106797593 | 5/2020 |
| CN | 111491293 | 8/2020 |
| CN | 111918300 | 11/2020 |
| CN | 112616189 | 4/2021 |
| EP | 3639391 | 4/2020 |
| KR | 10-2020-0026133 | 3/2020 |
| WO | WO 2014/107088 | 7/2014 |
| WO | WO 2020/151643 | 7/2020 |
| WO | WO 2021/061412 | 4/2021 |

OTHER PUBLICATIONS

Alrabeiah et al., "Millimeter Wave Base Stations with Cameras: Vision Aided Beam and Blockage Prediction," IEEE Vehicular Technology Conference, Oct. 2019, 6 pages.

Developer.apple.com [online], "Getting Raw Accelerometer Events," Jun. 16, 2019, retrieved on Aug. 19, 2022, retrieved from URL<https://developer.apple.com/documentation/coremotion/getting_raw_accelerometer_events>, 8 pages.

Developer.apple.com [online], "Getting Raw Gyroscope Events," Jun. 16, 2019, retrieved on Aug. 19, 2022, retrieved from URL<https://developer.apple.com/documentation/coremotion/getting_raw_gyroscope_events>, 8 pages.

Johnson, "5G New Radio in Bullets", 1st Edition, Jul. 28, 2019, 590 pages (abstract only), 7 pages.

Nitsche et al., "Steering with Eyes Closed: mm-Wave Beam Steering without In-Band Measurement," IEEE INFOCOM'15, Apr. 26, 2015-May 1, 2015, pp. 2416-2424.

Pefkianakis et al., "Accurate 3D Localization for 60 GHz Networks," ACM SenSys'2018, Nov. 4-7, 2018, pp. 120-131.

Sur et al., "BeamSpy: Enabling Robust 60 GHz Links Under Blockage," USENIX NSDI'16, Mar. 16-18, 2016, Santa Clara, CA, 15 pages.

Sur et al., "WiFi-Assisted 60 GHz Wireless Networks," MobiCom'17, Oct. 16-20, 2017, 14 pages.

Wang et al., "X-Array: Approximating Omnidirectional Millimeter-Wave Coverage Using an Array of Phased Arrays," ACM MobiCom'20, Sep. 21-25, 2020, 14 pages.

Wei et al., "Pose Information Assisted 60 GHz Networks: Towards Seamless Coverage and Mobility Support," ACM MobiCom'17, Oct. 16-20, 2017, 14 pages.

Wei et al., "Facilitating Robust 60 GHz Network Deployment By Sensing Ambient Reflectors," USENIX NSDI'17, Mar. 27-29, 2017, 15 pages.

Wikipedia.org [online], "MUSIC (algorithm)," Jul. 14, 2022, retrieved on Aug. 19, 2022, retrieved from URL<https://en.wikipedia.org/wiki/MUSIC_(algorithm)>, 5 pages.

Yang et al., "Sensor-assisted Codebook-based Beamforming for Mobility Management in 60 GHz WLANs," IEEE MASS'15, Oct. 19-22, 2015, pp. 333-341.

* cited by examiner

SENSOR-ASSISTED MILLIMETER-WAVE BEAM MANAGEMENT

CLAIM OF PRIORITY

This application claims priority under 35 U.S.C. § 119(e) to U.S. Patent Application Ser. No. 63/227,916, filed on Jul. 30, 2021, the entire contents of which are hereby incorporated by reference.

TECHNICAL FIELD

This disclosure relates generally to wireless communications.

BACKGROUND

Wireless devices can include phased array antennas for transmitting signals to and receiving signals from remote devices (e.g., in a wireless network). A phased array includes a computer-controlled array of antennas that creates a beam of radio waves that can be electronically steered to point in different directions without moving the antennas.

Beamforming or spatial filtering is a signal processing technique used in antenna arrays for directional signal transmission or reception. This is achieved by combining elements in an antenna array in such a way that signals at particular angles experience constructive interference while others experience destructive interference. Beamforming can be used at both the transmitting and receiving ends (e.g., by phased array antennas) in order to achieve spatial selectivity.

SUMMARY

This application describes systems and processes for sensor-assisted antenna and beam selection for wireless networks. The systems and processes are configured to detect out of coverage (OoC) scenarios and perform beam management in response to detecting OoC scenarios. The systems and methods are configured to perform beam management during baseband interruption scenarios. In each scenario, the device (e.g., user equipment or UE) is configured to determine whether the UE is static or mobile. The UE is static when the UE is not moving in position or orientation, relative to a base station or another device with which the UE is communicating, for a given period of time. A UE is mobile when the UE has changed position or orientation (together called pose) within a given period of time. The UE is configured to detect an OoC scenario and perform beamforming in response to that detection, as subsequently described. The UE is configured to perform beam acquisition for beam tracking based on the determination of whether the UE is mobile or static, as subsequently described.

In some cases, wireless networks include transmissions using the millimeter wave (mmWave) spectrum. For example, the mmWave spectrum can be used for cellular technologies such as $3^{rd}$ Generation Partnership Project (3GPP) Fifth Generation new radio (5G NR) and/or Long Term Evolution (LTE) networks for mmWave frequency ranges (e.g., frequency range 2 (FR2), frequency range 3 (FR3), etc.) transmissions from base stations (e.g., next generation nodeBs or gNBs) or to and from client devices (e.g., mobile devices described throughout this description). In general, FR2 transmissions are between 24.25 GHz to 52.6 GHz. Generally, mmWave high bandwidth (e.g., about 400 MHz) transmissions have a relatively high propagation loss. For example, mmWave transmissions can have a 20 dB loss relative to sub 6 GHz bands, such as those used for frequency range 1 (FR1) transmissions.

To overcome this loss, mmWave-enabled devices described herein are configured for beamforming, beam management, and antenna selection based on sensor feedback of one or more sensors of the mmWave-enabled device. Beamforming enables a device to steer the radiofrequency (RF) energy in a particular direction, overcoming mmWave propagation loss. Beams are typically fixed and designed a-priori in codebooks such as phase-amplitude combinations for antenna elements. The transmitting device forms a beam by varying an amplitude and/or a phase of one or more elements of a phased array antenna. Generally, the transmitting device generates a beam based on predefined phase-amplitude combinations for each antenna of the array to ensure that a narrow beam of relatively high power is transmitted in a desired direction with respect to the phased array antenna. Beam management enables a device to identify an optical beam for transmission in each of the uplink and downlink directions. Beam selection enables an mmWave-enabled device (e.g., a UE) to ensure high-speed connectivity by improving wireless coverage for a given uplink or downlink transmission. The sensors on the mmWave-enabled devices are configured to provide data indicates how the device has moved in an environment. The systems and processes for sensor-assisted beam selection are configured to use feedback from sensors on the mmWave-enabled devices to optimize beamforming and beam management to mitigate propagation loss, increase efficiency in beam determination regarding time and/or resources, and improve link performance.

Beam management includes processes by which the UE modifies settings of phase shifters of the phased antenna array. Beam management includes receiving, from a remote device such as a base station, a reference signals known to the UE. Typically, the base station sends multiple signals using the same transmission configuration, including a same transmission (Tx) power, Tx antenna pattern, and Tx precoding. The UE can measure link metrics using several different phase shifters settings (called a beam scan). The UE takes measurements on those reference signals. Generally, the UE takes multiple measurements with multiple phase shifters settings on a reference signal using the same transmission configuration. Based on those measurements, the UE attempts to optimize the phase shifter settings for the ongoing communication and the specific transmission configuration the base station used to obtain a beam with the best overall link metrics.

A data processing system (e.g., one or more processing devices or computing devices) of a UE is configured to perform beam selection based on how the UE has moved in an environment and one or more signal metrics associated with each orientation and/or position of the UE with respect to a base station. The data processing system is configured to detect an operational scenario of the UE, such as an out-of-coverage (OoC) scenario. An OoC scenario is also called a non-line-of-sight (NLOS) scenario. An OoC or NLOS scenario includes operation situations in which there is no clear or direct line of sight (LOS) path between the base station and the UE for a strong signal. Out-of-coverage scenarios can be attributed to blockages or base station/UE antenna misalignments, as there is not 360° beam coverage in 5G UEs. The data processing system is configured to improve beam selection of 5G mmWave devices in OoC/NLOS (hereinafter OoC) scenarios. The data processing system uses wireless signal metrics to determine that the UE is in an OoC scenario. The metrics include reference signal received power (RSRP), signal to noise ratio (SNR), or delay spread, among others. The data processing system also uses accelerometer data or gyroscope data, or both, to detect that the UE is experiencing an OoC scenario. The data processing system is configured to assist with beam management to identify the optimal beam based on detection of OoC scenarios.

The data processing system is configured to assist with beam management based on detection of OoC scenarios. For in-coverage scenarios, a beam management module of the data processing system scans only a few neighboring beams, terms of beam patterns, to capture short-term channel dynamics. When the data processing system detects an OoC scenario in which the UE is static, the beam management module of the data processing system performs an extended, hierarchical beam scan. The data processing system initiates a full scan of beams starting from a finer beam (e.g., a maximum strength beam) and neighboring beams. This is performed because the channel is expected to be less dynamic in a static scenario compared to a mobility scenario. The data processing system terminates scanning potential beams when a measured RSRP is above a threshold value. Extended beam scanning can be performed in static settings because, in a static setting, the wireless channel does not change rapidly. The UE has time to perform a wide scan before the channel changes. The extended beam search can guarantee that the data processing system selects a best performing beam.

When establishing a connection, a UE typically goes through an initial beam acquisition period. During this period, the UE determines which beam is a best beam or optimal beam. An optimal beam is associated with better link metrics, compared to other beams. The link metrics include higher throughout, higher power, higher SNR, lower delay spread, among others. The UE performs adjustments during an ongoing beam tracking phase to maintain a best beam wherein the beam configuration can change. During beam acquisition, the UE has a period of lesser channel quality, impacting the user experience negatively.

For mmWave networks, the UE can experience mmWave baseband interruptions caused by, for example, a call on a second subscriber identity module (SIM). A baseband interruption interrupts all communication on the mmWave link for a duration of the interruption. The interruption reduces or eliminates the UE's ability to perform beam tracking. In some systems, the UE may require a repeated beam acquisition period following the interruption, even if the UE has not moved at all, unnecessarily causing an impact on the overall user experience.

The systems and processes for sensor-assisted antenna and beam selection for wireless networks enable the UE to avoid the beam acquisition period when the UE is static. The UE can quickly reestablish the prior link using the previous optimal beam.

The systems and processes described in this document enable one or more of the following advantages. The data processing system is configured to reduce or eliminate throughput drop experienced during OoC scenarios. For example, when the UE is static with orientation relative to a node being an azimuth of 140° and elevation of 180°, the cell power of the UE can be −100 dBm. This scenario is considered out-of-coverage (OoC) because there is no beam to adequately cover the UE orientation. In such cases, the data processing system is configured to cause the UE to select a beam that avoids a 65% throughput drop, which could occur in conventional beam management approaches without detection of OoC scenarios as described herein.

Generally, a UE can train a limited number of beams per synchronization signal block (SSB). Typically, a UE trains only a few "neighboring" beams and does not scan all the available beam options. Consequently, the UE can get "stuck" using suboptimal beams in which the selected beam and its nearest neighbors are all suboptimal, but a superior beam is not scanned due to its distance from the selected beam. The systems and methods described herein overcome this technical limitation by identifying OoC scenarios and expanding beam search for selection of better quality beams, increasing both beam throughput and beam power.

The processes and systems for sensor-assisted antenna and beam selection enable the UE to recover from baseband interruption bypassing a full beam acquisition process. The UE can recover from baseband interruption with a shorter period in which channel quality is adversely affected and more quickly reestablish a high quality link in situations in which the UE is static. For example, if the UE is static and the UE performs operations using the second SIM, the UE can recover the previous beam without the delay of beam acquisition, reducing or eliminating negative effects on user experience (e.g., watching a video or downloading data, etc.).

The processes and systems for sensor-assisted antenna and beam selection enable a UE or other similar device to address changes to the environment of the UE and allow for increased mobility of the UE (which can represent a change in an environment of the UE). For example, a device using mmWave communication may frequently adjust beam and antenna selection in response to physical changes in the environment of the device (e.g., moving cars or trees) or movement of the device. Changes in the environment may cause blockages in a communication path of the UE or changes in location of the remote device (e.g., a node) in communication with the UE. This can cause the UE and/or node to frequently adjust its beams to achieve a better performance for a communications link. The processes and systems for sensor-assisted antenna and beam selection enable the mmWave devices in the environment to quickly (e.g., instantly or nearly instantly) determine an optimal beam selection and/or antenna selection (when applicable) for improved performance on the communications link in response to these environmental changes and/or movement of one or both of the communicating devices.

The one or more advantages previously described can be enabled by one or more implementations as described in the following sections.

In a general aspect, a method includes obtaining motion data from one or more motion sensors coupled to a wireless device; determining, based at least on the motion data, that the wireless device is static relative to a remote device that is in communication with the wireless device using a beam generated by the wireless device; obtaining data representing one or more link metrics of the beam, the link metrics being associated with a period of time that the wireless device is static; determining, from the one or more link metrics, a link stability value associated with the beam, for the period of time that the wireless device is static; determining that the wireless device is out of coverage (OoC) with respect to the remote device based on the link stability value associated with the beam; in response to determining that the wireless device is OoC with respect to the remote device, selecting a first beam group including one or more first beams generated by the wireless device; determining, for each beam of the first beam group, a respective link stability value for the beam; selecting, based on the determining, a particular beam of the one or more first beams; and reestablishing communication with the remote device using the particular beam.

In some implementations, determining that the wireless device is out of coverage (OoC) with respect to the remote device based on the link stability value associated with the beam comprises: comparing the link stability value to a predetermined threshold value; and determining that the link stability value fails to satisfy the threshold value based on the comparing.

In some implementations, the threshold value is determined using a machine learning model trained with link metric data that are labeled as representing an unstable link of an OoC scenario or a stable link of a line of sight (LOS) scenario.

In some implementations, the link stability value represents a standard deviation of a link metric of the one or more link metrics.

In some implementations, the link stability value represents a minimum value of a link metric of the one or more link metrics.

In some implementations, the one or more link metrics include at least one of a signal to noise (SNR) ratio of a signal received from the remote device, a delay spread value of the signal, a magnitude of a change in an angle of arrival (AoA) of the signal, the reference signal received power (RSRP) of the signal, or the received signal strength indicator (RSSI) (e.g., RSRP/RSSI/SINR).

In some implementations, selecting a particular beam comprises selecting a first beam of the first beam group, associated with a respective link stability value that satisfies a threshold link stability value.

In some implementations, selecting a particular beam comprises determining that the first beam group does not include any beam that is associated with a link stability value satisfying a link stability threshold; in response to the determining, selecting a second beam group, wherein second beams of the second beam group are further from the beam than the first beams of the first beam group; and selecting a second beam from the second beam group.

In some implementations, the one or more motion sensors comprise at least an accelerometer or a gyroscope.

In some implementations, the wireless device and the remote device are configured for mmWave communication using frequency range 2 (FR2).

In some implementations, the operations include retrieving the motion data periodically to determine if the wireless device is moving or is static.

In some implementations, the wireless device includes an antenna array including at least a specified number of beam configurations, and wherein selecting the particular beam comprises selecting one of the specified number of beam configurations.

In a general aspect, a method includes receiving, from one or more motion sensors of a wireless device, motion data indicative of a motion of the wireless device during an interruption to a baseband (BB) communication link between the wireless device and a remote device; retrieving a mapping of amounts of motion of the wireless device to corresponding beam groups of the wireless device; classifying the motion data as representing an amount of motion; based on the classifying, identifying at least one beam group of the mapping for performing beam acquisition; selecting, from the at least one beam group, a particular beam of the wireless device; and reestablishing communication with the remote device using the particular beam.

In some implementations, the operations include detecting the interruption to the BB communication link; and initiating, in response to the detecting, a measurement of the motion of the wireless device during the interruption to the BB communication link, wherein the motion data represents a total motion of the wireless device during the interruption to the BB communication link.

In some implementations, classifying the motion data as representing the amount of motion comprises: determining that the wireless device has not moved during the interruption to the BB communication link; identifying, based on determining, an initial beam included in the at least one beam group being used when the interruption to the BB communication link is detected by the wireless device; and wherein the particular beam includes the initial beam.

In some implementations, the initial beam is selected independent of a beam acquisition process by the wireless device.

In some implementations, selecting the particular beam is based on one or more link metrics associated with each beam of the at least one beam group in a beam acquisition process.

In some implementations, the mapping of amounts of motion of the wireless device to corresponding beam groups comprises a relation of a particular amount of motion to a beam configuration entry in a beamforming codebook.

In some implementations, classifying comprises executing a machine learning model that is trained using labeled motion data.

In a general aspect, user equipment (UE) includes at least one motion sensor; one or more antenna arrays each configured for at least two beam configurations; one or more processors; and a non-transitory computer-readable storage medium storing instructions which, when executed by the one or more processors, cause the one or more processors to perform operations as described herein.

In a general aspect, a processor for a user equipment (UE), includes circuitry configured to communicate with a remote device; and circuitry to execute one or more instructions that, when executed, cause the processor to perform operations as described herein.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
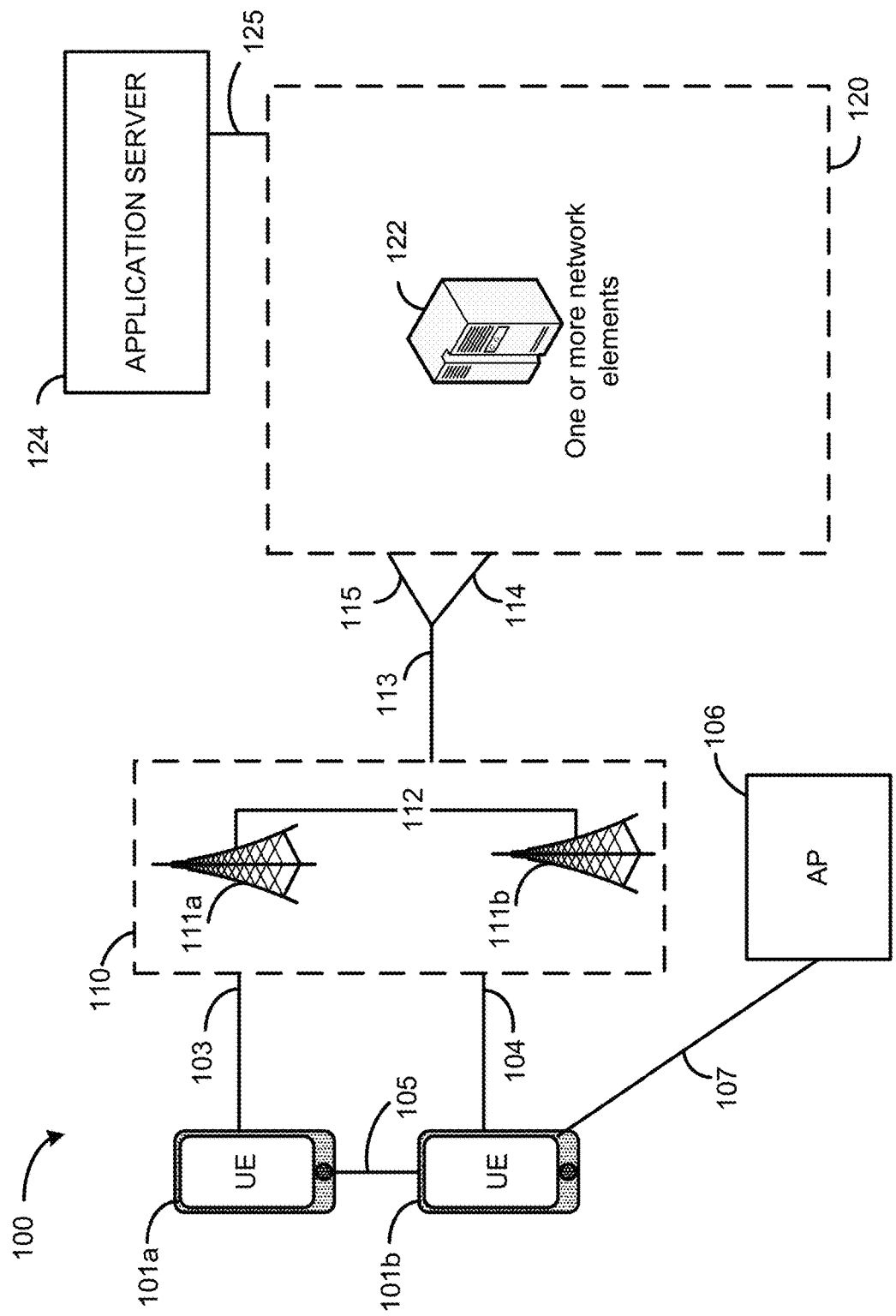
FIG. 1 illustrates an example wireless communication system, according to various embodiments herein.

The techniques described here enable a wireless device to perform beam selection in response to changes to the channel of a communications link. A device includes one or more sensors that provide motion data to the device. The device is configured to perform beamforming in response to receiving the motion data. This enables the device to perform beamforming to improve communication performance using less bandwidth overhead and with less latency than performing full scanning of beams an antenna of the device.

Generally, the beam selection is performed to improve communication bandwidth in the context of mmWave systems (e.g., using FR2 frequencies, FR3 frequencies, or other mmWave frequencies). mmWave communication links have a relatively high propagation loss over long distances (e.g., over 10 s or 100 s of meters) relative to losses for FR1 links. To mitigate propagation loss and improve performance of a communication link, mmWave-enabled devices are configured for beamforming, beam management, and antenna selection based on sensor feedback of one or more sensors of the mmWave-enabled device.

Beamforming enables a device to steer the radiofrequency (RF) energy in a particular direction. The transmitting device forms a beam by varying an amplitude and/or a phase of one or more elements of a phased array antenna. Generally, the transmitting device generates a beam based on predefined phase-amplitude combinations for each antenna of the array to ensure that a narrow beam of relatively high power is transmitted in a desired direction with respect to the phased array antenna.

The UE receives reference signals periodically (e.g., nearly continuously) from a base station or other remote device. The UE periodically (e.g., nearly continuously) optimizes phase shifter settings for beamforming. For example, a Synchronization Signal Block (SSB) is a block of 4 symbols, each including reference symbols. The UE uses the demodulation reference signal (DMRS) including these symbols for beam management.

In some implementations, the UE performs beam management using a codebook. The codebook includes a set of phase shifter settings, each corresponding to a respective beam. The codebook enables the UE to perform beam management as follows. The UE tries a beam on reference symbols, and then uses the beam with a best corresponding measurement of respective link metrics. The codebook has number of possible beams that is not too large compared to the number of measurement occasions available. The number of measurement occasions corresponds to a number of measurement symbols available with the same transmission configuration in a given time.

To comply with radio frequency (RF) requirements, the UE can include multiple phased arrays with (e.g., 4 elements, 8 elements, 16 elements, etc.). The codebook size is thus larger than 30 beams. Generally, a base station provides the SSB signal for UE beam management, which enables 4 measurement changes every 20 milliseconds. Thus, the UE performs the initial acquisition phase, by which the UE acquires the best beam in multiple steps, if no additional information is available. The UE then performs a tracking phase where the UE tracks the best UE beam by measuring a limited number of beams based on the best current beam.

Beam management enables a device to identify an optimal beam for transmission in each of the uplink and downlink directions. In an example, for 5G NR mmWave transmissions, a node (e.g., a gNB) transmits synchronization signals periodically (e.g., between 5 to 160 millisecond (monitoring system) periods) to identify best transmit and receive beams. This includes an initial beam training step using multiple beams. In this first step, a wide sweeping range is covered using wider beam widths. A second step includes a beam refinement step. In this step, the UE sweeps over narrower beams over a narrower range than in the first step. This enables the UE to hone in on the desired beam direction. In the third step, the device is configured for beam refinement. In the beam refinement step, a user equipment (UE) performs tuning of the receive angle for the beam, and the node transmits using a fixed beam. The UE measures different signal strengths until an optimal configuration of the beams is found. In an example, for a 802.11ad/ay mmWave transmission, an access point (AP) and a wireless device (e.g., a UE) train their respective beams during sector level sweep (SLS) and the beam refinement process (BRP) as defined in 802.11 standards.

Antenna selection enables a device (e.g., a UE) to ensure high-speed connectivity by improving wireless coverage for a given uplink or downlink transmission. In an example, either of a blockage of a first antenna or an antenna misalignment can cause throughput levels to decrease relative to an ideal transmission environment. In this case, the UE is configured to select from a plurality of phased antenna arrays (also called antenna panels).

The mmWave-enabled devices include one or more sensors configured to provide motion data. The motion data indicates how the device has moved in an environment. The motion data from the sensors enables the device to estimate beamforming parameters for an optimal connection based on previous data indicating a strong signal.

A data processing system of a UE is configured to determine whether the UE is in a static scenario or a mobile scenario. A static scenario refers to situation in which the UE is not moving, turning, or otherwise changing a position or orientation relative to a base station for a given period of time. A mobile scenario is a situation in which the UE is moving or turning currently or has changed a position or orientation with respect to the base station within a recent time period (e.g. within 5 seconds or less, though the threshold can be shorter or longer as needed). Based on the determination of whether the UE is static or mobile, the UE performs beam selection. In a static scenario, the data processing system of the UE determines if the UE is in an OoC scenario by analyzing one or more beam metrics. If the UE is in an OoC scenario, the data processing system performs an increasingly wise search of neighboring beams from the current beam to determine if a beam switch should occur.

In some implementations, the UE beam management and transmission operations over the phased array are momentarily interrupted. This could occur, for example, when performing dual-SIM operations. When a secondary SIM occupies the baseband resources for other operations, an interruption of the phased array communication occurs.

During the interruption, it is possible that the UE has moved (e.g., is mobile as previously described) or that the UE has not moved (e.g., is static previously described). When the UE is static, the best beam is likely the same beam being used by the UE prior to the BB interruption. When the UE is mobile, the UE may rotate to a position requiring a completely different beam than before the interruption. In this case, the UE should perform a new initial acquisition.

In a situations in which the UE is static and a baseband interruption has occurred, the UE is configured to reestablish the link without performing a beam acquisition period. The UE selects as the optimal beam a previously used beam that was in use prior to the baseband interruption. If the UE is mobile, the UE performs beam acquisition. The UE can use movement data to attempt to predict a new optimal beam. Alternatively or in addition, the UE can initiate beam acquisition based on the previously used beam prior to interruption.

Additional examples of these processes are subsequently described in relation to the figures. The systems and processes described are compatible with any mmWave technologies (e.g., 802.11ad/ay, 5G, etc.). The system is lightweight and is configured to select a beam, antenna, or both independent of any antenna or beam scanning.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

The data processing system 202 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the data processing system 202 may be coupled with or may include memory/storage elements and may be configured to execute instructions stored in the memory or storage to enable various applications or operating systems to run on the system 200. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of data processing system 202 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the data processing system 202 may include, or may be, a special-purpose processor/controller to carry out the techniques described herein.

As examples, the processor(s) of data processing system 202 may include an Apple A-series processor. The processors of the data processing system 202 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the data processing system 202 may be a part of a system on a chip (SoC) in which the data processing system 202 and other components are formed into a single integrated circuit.

Additionally or alternatively, the data processing system 202 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the data processing system 202 may include logic blocks or logic fabric, and other interconnected resources that may be programmed to perform various functions, such as the procedures, methods, functions described herein. In some examples, the data processing system 202 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband module 210 may be implemented, for example, as a solder-down substrate including one or more integrated circuits, a single packaged integrated circuit soldered to a main circuit board or a multi-chip module including two or more integrated circuits.

The antenna beam panel 212 (also called a radio front-end module (RFEM)) may comprise a mmWave RFEM and one or more sub-mmWave radio frequency integrated circuits (RFICs). In some examples, the one or more sub-mmWave RFICs may be physically separated from the mmWave antenna beam panel 212. The RFICs may include connections to one or more antennas or antenna arrays, and the antenna beam panel 212 may be connected to multiple antennas. In some examples, both mmWave and sub-mmWave radio functions may be implemented in the same physical antenna beam panel 212, which incorporates both mmWave antennas and sub-mmWave. In some implementations, the mmWave functions implement the IEEE 802.11ad and 802.11ay standards.

The sensor module 204 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lens-less apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others. These sensors are further described in relation to FIG. 3. As the pose of the antenna of the system 200 changes in an environment of the system, the sensors 204 capture the motion of the system and send the motion data to a motion detection module 206.

The data processing system 202 is configured to host the motion detection module 206 and a beam selection module 208. The motion detection module 206 is configured to determine, from the motion data of the sensors 204, how the device is moving in an environment. The motion detection module 206 can determine a new position and orientation (e.g., a pose) of the device relative to a prior pose of the device for which an optimal beam and antenna were selected. The updated pose can be provided to the beam selection module 208.

The beam selection module 208 is configured to select, based on the updated pose provided from motion detection module 206, a beam of the panel 212 for transmitting or receiving data by the system 200. The selection of the beam includes a particular configuration of a selected phased antenna array to generate a directional beam from that array panel. In an example, the data processing system 202 performs the selection process continuously or nearly continuously as the device moves or is static in an environment. In some implementations, the data processing system 202 performs the selection process with the beam selection module 208 when one or more link metrics (e.g., SNR, RSRP, delay spread, etc.) drops below a threshold (e.g., when CoC is detected).

The beam selection module 208 is configured to OoC/NLOS scenarios and also assist beam management to identify an optimal beam. The beam selection module 208 receives data from the motion detection module 206 that indicates whether the UE is static or in motion. The beam selection module receives data from a baseband module 210 including data representing channel stability metrics, such as SNR, RSRP, delay spread, etc., of wireless signals. The beam selection module 208 generates an indication that the UE is either "in-coverage" or "out-of-coverage." The beam selection module then sends beam selection data to the antenna panel 212 that assists the UE in determining the optimal beam.

The system 200 receives input from each of the sensors 204 and the baseband module 210. The baseband (BB) feedback can include signal-to-noise ratios (SNR), delay spread, RSRP, angle of arrival (AoA), and similar link metrics. The feedback data available from the wireless baseband module 210 is used by the data processing system 202 to infer an orientation of wireless dominant paths. Wireless dominant paths include paths that signals follow from the transmitter to the receiver. The data processing system 202 uses the baseband module 210 feedback data to identify whether the in-use antenna panel or beam, or both, are optimal. Generally, if the AoA data are not available for the system 200, the AoA is estimated by the data processing system 202.

Figure 2:
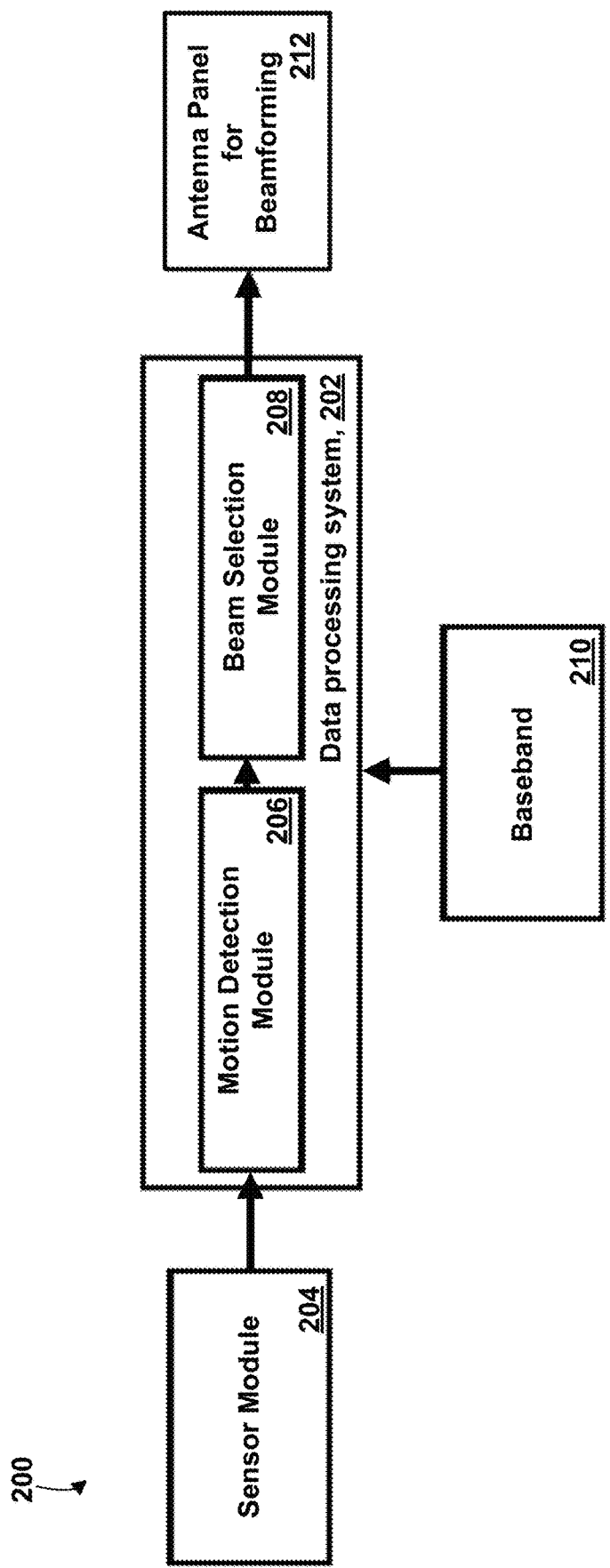
FIG. 2 illustrates an example of a platform or device configured for sensor-assisted antenna and beam selection in accordance with some implementations of the present disclosure.
Figure 3:
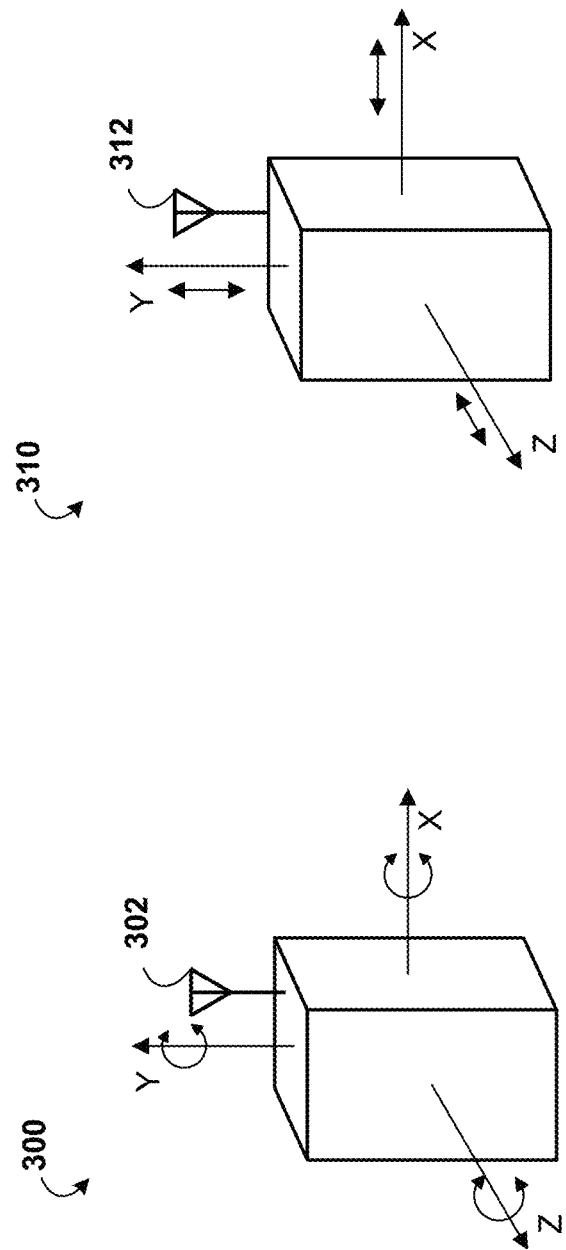
FIG. 3 illustrates example devices for motion and rotation detection for sensor-assisted antenna and beam selection in accordance with some implementations of the present disclosure.

Briefly turning to FIG. 3, devices 300 and 310 show examples of data gathered by sensors 204 of FIG. 2. For example, device 300 includes a gyroscope. The gyroscope is configured to measure a rate at which the device 300 rotates around a spatial axis including a rotational pitch, roll, and yaw, movement (e.g., in degrees or radians) of the device 300. The device 300 enables a data processing system receiving the data from the gyroscope to determine change in orientation of one or more antennae (such as antenna 302), such as with respect to a base station. Similarly, device 310 includes accelerometer(s) configured to measure changes in velocity along x, y, and z axes (e.g., translational motion) for the device 310. The device 310 enables a data processing system receiving the data from the accelerometer to determine change in orientation of one or more antennae (such as antenna 312), such as with respect to a base station. Devices 300 and 310 are combinable into a single device including both gyroscope(s) accelerometer(s).

Returning to FIG. 2, the motion detection module 206 receives accelerometer motion data and identifies a translational movement (e.g., in centimeters) along each of the x, y, and z axes. The motion detection module 206 receives the gyroscope motion data and determines a rotation of the device around each of the x, y, and z axes. The result is an updated pose of the system 200 relative to a prior pose of the system. The initial pose of the system is determined relative to the remote device connected by the communications link. The initial pose can be determined based on AoA data (e.g., from the BB module 210). In some implementations, a one-time beam sweep is performed to determine the AoA if the AoA data are not available, as subsequently described. The motion detection module 206 sends the motion data to the beam selection module 208 which is configured for beam selection.

The beam selection module 208 performs selection of the beam based on data from the BB module 210 and the updated pose provided by the motion detection module 206. Because beam radiation patterns and antenna positions are predefined for a given device (e.g., device of system 200), the beam selection module 208 includes coverage map data. The coverage map data includes a highest gain antenna panel and beam identities for each available device orientation and position.

The beam selection module 208 generally selects a new beam based on two scenarios. A first scenario is a blockage scenario, in which OoC/NLOS occurs between the system 200 and the remote device, thought the system 200 (e.g., a UE) is static. A second scenario is a mobility scenario in which mobile device movement (e.g., of the system or of the remote device) causes antenna or beam misalignment or both antenna and beam misalignment.

In the blockage scenario, the beam selection module 208 detects there is a blockage or NLOS scenario based on detecting that the wireless connection is unstable, even though the system 200 is not moving in position or orientation (e.g., is static). The data processing system 202 detects the OoC scenario when one or more communication metrics (e.g., measured by baseband module 210) fail to satisfy a threshold, even though the data processing system 202 has determined the UE is in a static state. In some cases, the one or more communication metrics fail to satisfy the threshold by having values less than (or equal to) the threshold value. In other cases, the one or more communication metrics fail to satisfy the threshold by having values greater than the threshold value.

Generally, the wireless channel is more stable in LOS environment than in a blockage/NLOS environment. When channel stability is low, it is likely that there is a NLOS setting or scenario, and a beam or antenna switch (or both) may improve the channel stability. The data processing system 202 determines channel stability using the following metrics. The data processing system 202 determines channel stability is low by measuring an SNR drop and contextualizing the drop using a standard deviation value associated with the SNR. For example, a standard deviation above 1 dB for SNR can be indicative of an unstable link and OoC. Table 1 shows example scenarios for LOS and NLOS detection.

TABLE 1

Example Values for LOS and NLOS Scenarios

|  | LOS | NLOS 1 | NLOS 2 |
|---|---|---|---|
| SNR (dB) | 34 | 30.4 | 27.9 |
| SNR Standard Deviation (dB) | 0 | 1.14 | 2.22 |
| RMS Delay Spread (ns) | 0 | 3.76 | 7.6 |
| Number of Dominant Paths | 1 | 4 | 2 |

A blockage generally results in a significant initial SNR drop and subsequent high SNR deviations. The data processing system 202 determines that the channel stability is low by measuring delay spread of the signal. The delay spread is generally higher in NLOS/blockage settings in comparison to LOS settings. The data processing system 202 determines that the channel stability is low by measuring AoA changes. The AoA of the wireless dominant path generally changes when the wireless LOS path between two devices is blocked.

In some implementations, the SNR or delay spread values can increase and AoA can change due to mobility, rather than due to blockage. The system 200 is configured to differentiate blockage from mobility scenarios by checking the motion data from the sensors 204. A blockage scenario is determined when sensors indicate that the system 200 is static. In some implementations, the thresholds for the SNR deviation, delay spread, or any other channel metrics are determined by training models prior to run-time (e.g., using machine learning (ML) or similar models. For example, a machine learning model can be trained with data including various values of the metrics to classify the signal from the remote device as being blocked or unblocked for each of the various combinations of values. The machine learning model can be used to determine the appropriate thresholds for each of the one or more metrics to ensure that a characterization of a signal as being blocked or unblocked represents the correct scenario.

Once the data processing system 202 determines that the system 200 is in an OoC scenario, the beam selection module 208 assists in beamforming. Generally, for in-coverage scenarios, the beam selection module 208 scans only a few neighboring beams. Here, a neighboring beam is defined in terms of beam patterns. The beam selection module 208 captures short-term channel dynamics for the neighboring beams. Upon OoC detection, the beam selection module 208 performs an extended, hierarchical beam scan. The hierarchical beam scan of the selection module 208 includes an iterative process, described further in relation to FIG. 4.

Figure 4:
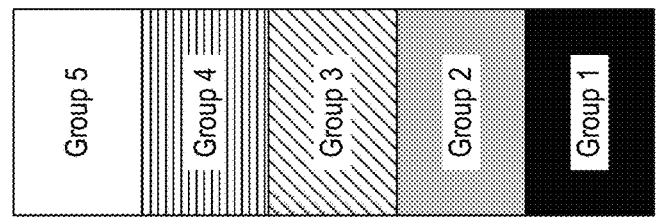
FIG. 4 illustrates example groups of beams for beam acquisition.
Figure 4:
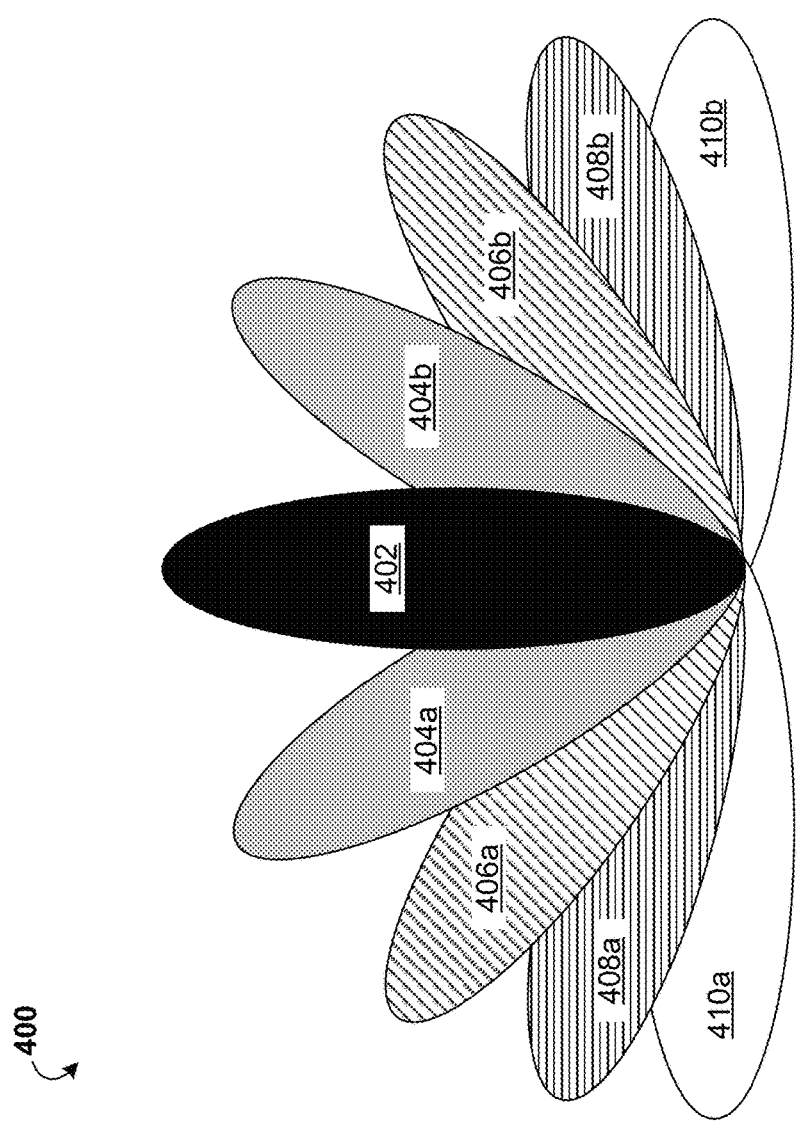

FIG. 4 illustrates example groups 400 of beams for beam acquisition. The hierarchy starts with a finer (maximum strength) beam 402 and next neighboring beams 404a-b. While the initial beam in the example of FIG. 4 is the central beam 402, any of beams 402-410 can be the initial beam of the scan. The scan begins with a first beam (e.g., beam 402). For the first beam, link metrics are compared to predefined thresholds. As previously discussed, the predefined thresholds can be determined based on machine learning approaches or through heuristic models.

The beam selection module 208 classifies each of the beams of set 400 into groups. In set of beams 400, five groups are shown as an illustrative example. The groups can be classified based on distance from the current beam 402. Each group can include one or more beams (e.g., beam 402 in group 1, beams 404a-b for group 2, beams 406a-b for group 3, beams 408a-b for group 4, and beams 410a-b for group 5).

The beam selection module 208 is configured to scan successive groups to determine optimal beam selection. The beam selection module 208 can start with group 1, then scan groups 1-2, then groups 1-3, and so forth. In a first scenario, a limited number of beam groups are scanned (e.g., group 1 or groups 1-2). In some second scenario, all the beams are scanned by the beam selection module 208.

The beam selection module scans beams close to group 1 (e.g., neighboring beams) and then moves to groups further from group 1. Here, a beam is further from the current beam (e.g., group 1) when an angle/azimuth of the beam is greater for beams of that group compared to beams in first beam group. For example, Group 5 is further from group 1 than group 4, group 4 is further from group 1 than group 3, and group 3 is further from group 1 than group 2.

The beam selection module terminates scanning when a particular link metric (e.g., measured RSRP) is above the predetermined threshold value. In some implementations, the metric can be a layer 1 (physical layer) related metric. For example, the metric can include throughput, receive power, SNR, RSRP, RSRQ, SINR, RSSI, SIR, and so forth. Generally, threshold values for these metrics are based on particular requirements and are not fixed.

Returning to FIG. 2, in the movement scenario, the beam selection module 208 is configured to determine a new beam for the system 200 based on the updated pose provided by the motion detection module 206. The change in pose is determined from a known pose of the system 200 relative to the remote device. The known pose can be determined (e.g., once) by using the BB feedback data, such as AoA of a signal. Generally, this can be determined based on where a highest receive power is present in the antenna array. For example, values of which phi or theta angles are associated with a highest power can be provided. Generally, the system associates the determined AoA with a peak beam of the remote transmitter. In other words, a strongest lobe estimated to be at the position of the determined AoA. From the motion data and the AoA, the updated pose is determined and a new position in a coverage map, subsequently described, is selected. Based on the position in the coverage map, a particular beam of the panel 212 is chosen for transmitting and/or receiving data in the communications link with the remote device. This process is described in U.S. Prov. Pat. App. 63/135,503, filed Jan. 8, 2021, hereby incorporated by reference in entirety.

Figure 5:
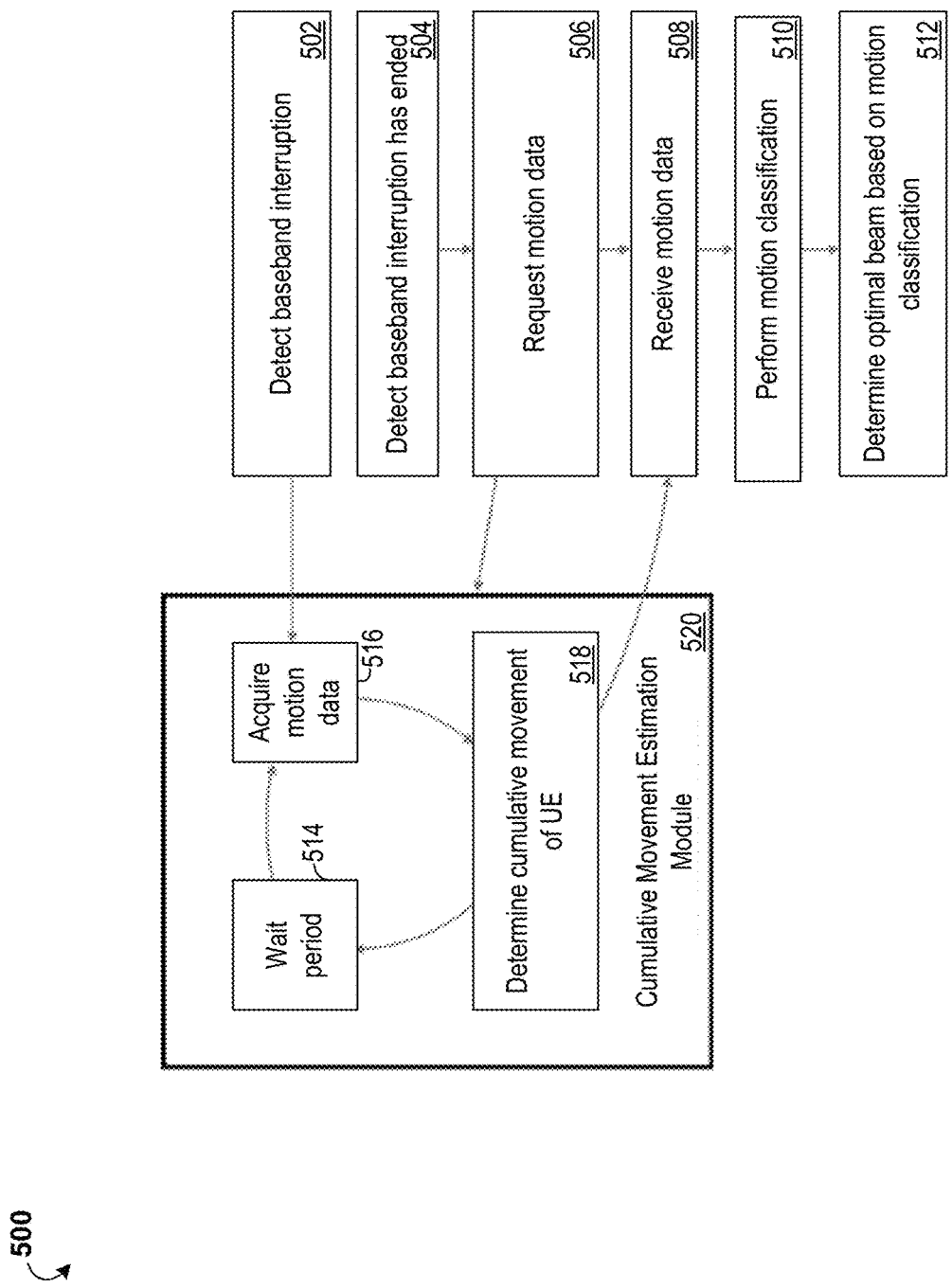
FIG. 5 illustrates an example process for sensor-assisted antenna and beam selection by a UE.

FIG. 5 illustrates an example process 500 for sensor-assisted antenna and beam selection by a UE (such as UEs 101 of FIG. 1). The process 500 of FIG. 5 enables a UE to recover from baseband interruption and bypass a beam acquisition period when the UE is static or nearly static.

The UE is configured to track physical movement of the UE, such as using a cumulative movement estimation module 520 (hereinafter movement module 520). The movement module 520 is configured to track movement of the UE in response to receiving a request from the data processing system of the UE (e.g., data processing system 202 of FIG. 2). The movement module 520 tracks the cumulative movement of the UE during BB interruptions. When the BB interruption is completed, and the UE begins to reestablish the mmWave link, the UE refers to the cumulative movement data to determine whether a new beam should be acquired, or whether the previously used beam should be used for resuming communication on the mmWave link. In some implementations, the movement module 520 is a part of the data processing system 202 of the UE. In some implementations, the movement module 520 is a separate device from the data processing system 202 of the UE.

The process 500 includes detecting (502) by the data processing system 202 of the UE that a BB interruption is occurring. The UE can detect that the BB interruption is occurring in response to one or more events, such as use of Tx hardware (HW) by a second SIM of a dual SIM system. For example, a user is downloading data on SIM 1, and a call (e.g., VoLTE) is received in SIM 2. The download is interrupted in SIM 1 until the call gets completed in SIM 2. Upon switching back to SIM 1 for resuming the download, the beam which is used can be suboptimal. The UE sends a request for motion data from the movement module 520. The motion module 520 receives the request from the data processing system 202 of the UE and exists a waiting period (514) in which the movement module is idle.

The movement module 520 is configured to acquire (516) motion data from the sensors of sensor module 204, previously described. The motion data acquired by the movement module 520 represents a cumulative movement of the UE (e.g., relative to a base station) while the BB interruption is occurring. This includes any motion of the UE from when the BB interruption begins to when the BB communications link is being reestablished (e.g., when a BB mmWave call is resuming). The data processing system 202 of the UE is configured to classify the cumulative motion as exceeding a threshold or not exceeding a threshold movement. In some implementations, several classes can exist for determining movement levels. Based on the classification, the data processing system of the UE is configured to determine whether complete new beam acquisition is needed, whether to perform a partial acquisition in which an initial beam guess is performed, or whether the prior selected beam can be used to reestablish the communications link. The UE is thus configured to limit data stalls and reduce negative impact to a user experience impact when recovering from baseband interruptions.

The data processing system 202 of the UE is configured to detect (504) that the BB interruption has ended and that the BB communication link is to be reestablished. The UE requests (506) the motion data from the movement module 520. The movement module receives the request from the data processing system 202 of the UE. In response to receiving the request, the he movement module 520 determines (518) a cumulative movement of the UE during the BB interruption. During the BB interruption, the movement module 520 continuously monitors motion data received from the sensor module 204.

The cumulative motion of the motion data includes a cumulative translation of the UE. The cumulative translation includes a distance the UE moved during the interruption in any lateral direction, as shown in device 410 of FIG. 3. Cumulative translation is measured by one or more accelerometers.

The cumulative motion of the motion data includes a cumulative rotation. The cumulative rotation represents how much the UE has rotated (e.g., in degrees of pitch, roll, and yaw) in relation to one or more reference fields. For example a first reference field is rotation in relation to a main signal angle of arrival (AoA) direction. In this example, the data processing system of the UE can determine a signal direction of arrival based on link metrics or other BB data. In some implementations, the AoA data is determined using baseband and gyroscope data or by baseband data alone. In another example, the movement module 520 of the UE determines rotation movement with respect to x, y and z axes of the UE (e.g., pitch, roll, and yaw). These data are used when a signal AoA value is unknown and cannot be determined indirectly by the data processing system 202. The data processing system 202 of the UE receives (508) the motion data from the movement module 520. The movement module 520 then returns to a standby wait period (514).

The data processing system 202 of the UE is configured to perform (510) movement classification based on the motion data received from the movement module 520. The movement classification includes determining how much movement has occurred for the UE, wherein each class of the classification relates to a corresponding search hierarchy, as previously described in relation to FIG. 4. Generally, if the UE has not moved at all, the beam search can be limited to group 1. If the UE has moved a small amount, the data processing system 202 classifies the motion data as a first tier of movement (e.g., less than a first, lowest movement threshold). In this example scenario, the data processing system 202 performs a search of group 1 (the narrow beam) and one or more neighboring beams (e.g., groups 1-2). Each group 1-5 can be associated with respective movement thresholds. In an example, the UE has moved above a maximum threshold movement value. In that case, a translation value exceeds a maximum translation threshold, a rotation value exceeds a maximum rotation threshold, or the combination of translation and rotation values exceeds a combination threshold. The data processing system 202 of the UE is then configured to perform a search of all five groups of FIG. 4 (e.g., a complete beam acquisition process searching all beams).

The groups of FIG. 4, and the corresponding searches, correspond to the beam codebooks for the UE. The codebook of beam configurations is hierarchical because the codebooks include wide beams and narrow beams. For example, wide beams include beams with wide coverage and low gain, using single antenna elements. Wide beams enable fast cell detection as the UE needs only to search for a limited number of beams. Narrow beams include beams with narrow coverage and high gain, using multiple antenna elements of the phased array. Narrow beams enable the UE to comply with RF requirements with their high gain but need to be numerous to cover a significant part of the UE's sphere.

For classification, the cumulative rotation is an input to the UE as to which type of hierarchical beam the UE uses following a given BB interruption. Rotation thresholds are based on a beam width for the narrow beam and for the wide beam. The data processing system 202 uses the cumulative translation in a similar manner. The data processing system 202 determines an equivalent rotation, and then selects a wide beam or a narrow beam type. The data processing system 202 makes an assumption for the UE for determining an equivalent rotation with respect to a base station. The data processing system 202 assumes a distance from the UE to the signal source. Generally, a "worst case" assumption of 2 meters can apply, but larger distances are typically used, because it is unlikely that the UE is closer than 2 meters from a base station.

In some implementations, the classification includes using a classifier. The classifier can be a result of a machine learning model that is trained with motion data. For example, different motion data are labeled with amounts of motion. The machine learning model is trained to determine or classify an amount of motion in the motion data. Each motion amount or classification can be mapped to an optimal beam configuration (e.g., from a codebook). The optimal beam configuration represents the beam that should be selected based on that amount of motion being detected. The machine learning model can be trained with the labeled motion data. For example, motion below a first threshold represents a static state in which no beam acquisition is performed. Rather, the beam being used when the BB interruption was first detected is selected for resuming the connection. In another example, an amount of motion greater than a lowest threshold but less than a secondary threshold is associated with a second motion amount. The second motion amount corresponds to a second group of beam configurations that are likely to be optimal beam configurations for the UE that has now moved to a new pose. Additional classifications of motion and respective mappings to beam configurations (e.g., of a codebook) can be added. In another example, each motion classification can be associated with one or more beam groups (e.g., of FIG. 4).

The threshold values can be set based on outputs of the trained machine learning model.

The data processing system is configured to determine (512) an optimal beam for resuming BB communications based on the motion data classification. The data processing system 202 causes the UE to use a better beam type (e.g., wide or narrow) to restart transmission and thus more quickly proceed towards a beam tracking phase than if the other beam type were selected. As previously described, the data processing system 202 causes the UE may reuse the same beam if the UE has not gone through any rotation.

Figure 6:
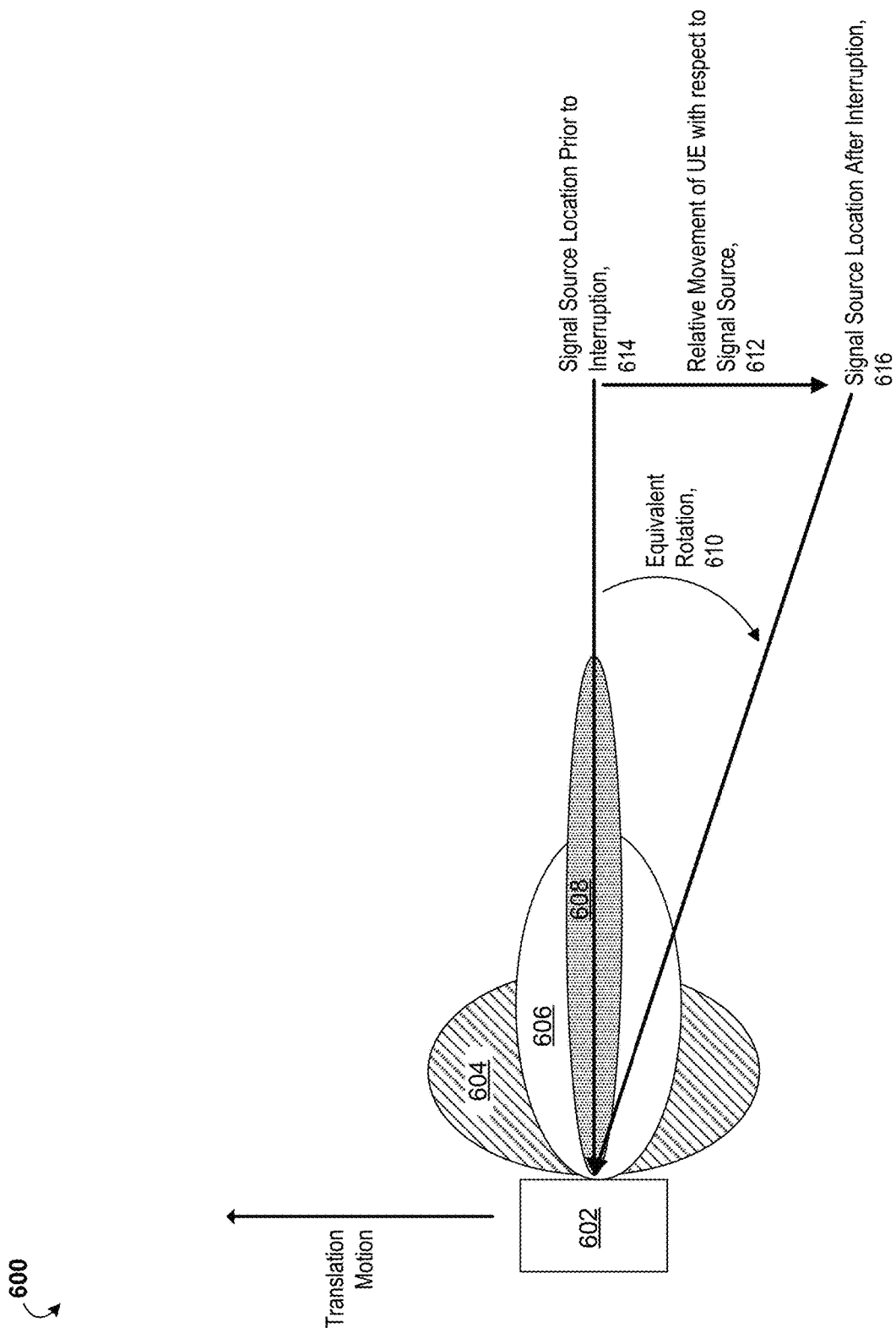
FIG. 6 illustrates an example environment for determining cumulative motion of the UE with respect to a remote device.

FIG. 6 shows an example environment 600 for classification of cumulative motion by a UE 602 (e.g., UE 101 of FIG. 1). The UE 602 is configured for a narrow beam communication link range 608, a wide beam communication link range 604, and middle beam communication link range 606 between wide and narrow beam communications links. The middle beam range 606 is wider than narrowest beam range 608 and narrower than widest beam range 604. In this example, the narrowest beam range 608 is initially directed toward the signal source, but this is not necessarily the case in a given environment. As previously described, the UE 602 is configured to determine an equivalent rotation 610 and a relative movement of the UE 602 with respect to a signal source 614 prior to the BB interruption and the signal source location 616 after the BB interruption is completed. In the illustration of FIG. 6, the middle beam range 606 is selected for communication based on the classification of cumulative motion by the UE. The UE performs a search over beams in the range 606 for reestablishing a connection, and beams of range 604 outside of range 606 need not be searched. This reduces beam acquisition time and reduces performance interruption to the user.

Figure 7:
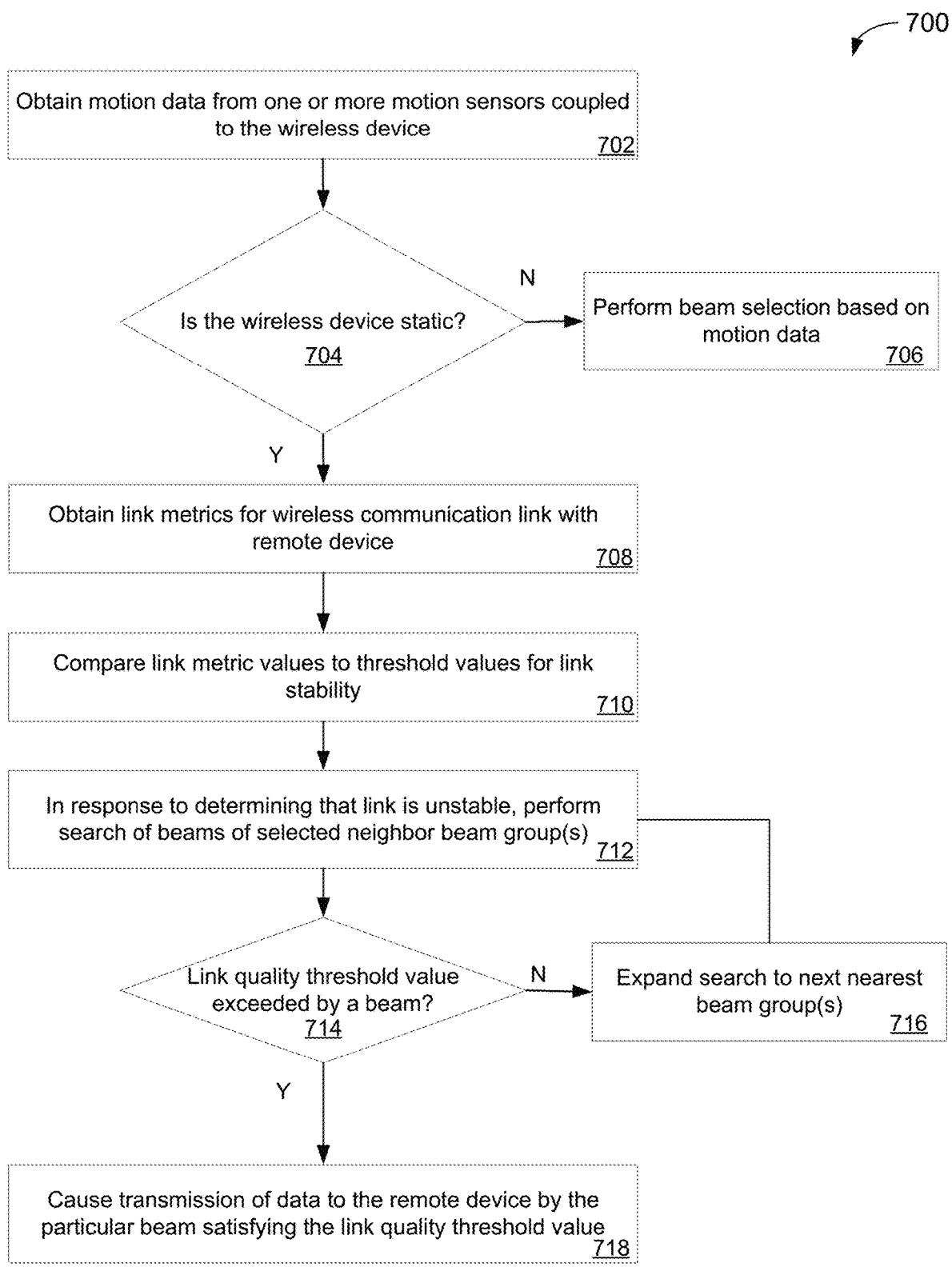
FIG. 7 illustrates an example of selection of a beam based on sensor feedback in accordance with some implementations of the present disclosure.

FIG. 7 illustrates an example process 700 for selection of a beam based on sensor feedback in accordance with some implementations of the present disclosure. In some examples, the electronic device(s), network(s), system(s), chip(s) or component(s), or portions or implementations thereof, of FIGS. 1-6 may be configured to perform the process 700. The process 700 includes, obtaining (702) motion data from one or more motion sensors coupled to a wireless device. In some implementations, the sensors can include one or both of accelerometers and gyroscopes. The process includes determining (704) whether the wireless device is static or mobile. The state of the wireless device can be determined based on a given time period (e.g., the last few seconds). The motion data indicate a change (or lack thereof) in a position and/or orientation of the wireless device.

In response to determining that the wireless device is in motion (and is not static), the process 700 includes performing (706) beam selection based on the motion data. Examples of estimating a beam based on motion data are described in relation to U.S. Prov. Pat. App. 63/135,503, filed Jan. 8, 2021, hereby incorporated by reference in entirety. In some implementations, performing (706) beam selection based on motion data comprises determining that the wireless device is experiencing a blockage or BB interruption, as described herein, such as in relation to FIG. 8.

The process 700 includes, in response to determining that the wireless device is static, obtaining (708) link metrics for the wireless mmWave communications link with the remote device, such as a base station (e.g., a gNB). In an example, the link metrics can include SNR, delay spread, AoA, RSRP, received signal strength indicator (RSSI), or any similar link metrics indicating link stability. The wireless device is configured to compare (710) the link metric values to threshold values representing link stability For example, a standard deviation of one or more of the RSRP, SNR, delay spread, or similar values can be measured for measurements of the respective link metric over the time period. If the standard deviation value exceeds a threshold (e.g., 1 dB for SNR), the link is considered unstable, even though the wireless device is not moving. The wireless device is thus determined to be in an OoC or NLOS scenario due to fluctuations in the link metrics despite the stationary wireless device.

The process 700 includes performing (712), in response to determining that the link is unstable and the wireless device is in an OoC scenario, a search of beams that are available. For example, the neighboring beams to the current beam can be searched to determine whether another beam has a better link quality than the current beam. Because the wireless device is static, a wider search of the beam space can be performed and the results of each beam test are comparable to one another. To initiate the search, the wireless device is configured to search nearest neighboring beams first. In some implementations, process 700 includes selecting the one or more respective thresholds by applying training data representing values of the one or more metrics to a machine learning model. The machine learning model is configured to classify the synchronization signal as blocked or unblocked.

The process 700 includes determining (714) if a link quality threshold is exceeded by any of the searched beams. If no searched beam exceeds threshold(s) for link quality, the process 700 includes expanding (716) the search to additional beam groups. In this example, beam groups further away from the current beam can be searched. The process is repeated until a suitable link is found that exceeds the quality threshold or until all beams are searched.

The process 700 includes causing (718) transmission of data by the wireless device using the selected beam that satisfies link quality threshold(s). Thus, the process 700 performs beam acquisition in a static context.

Figure 8:
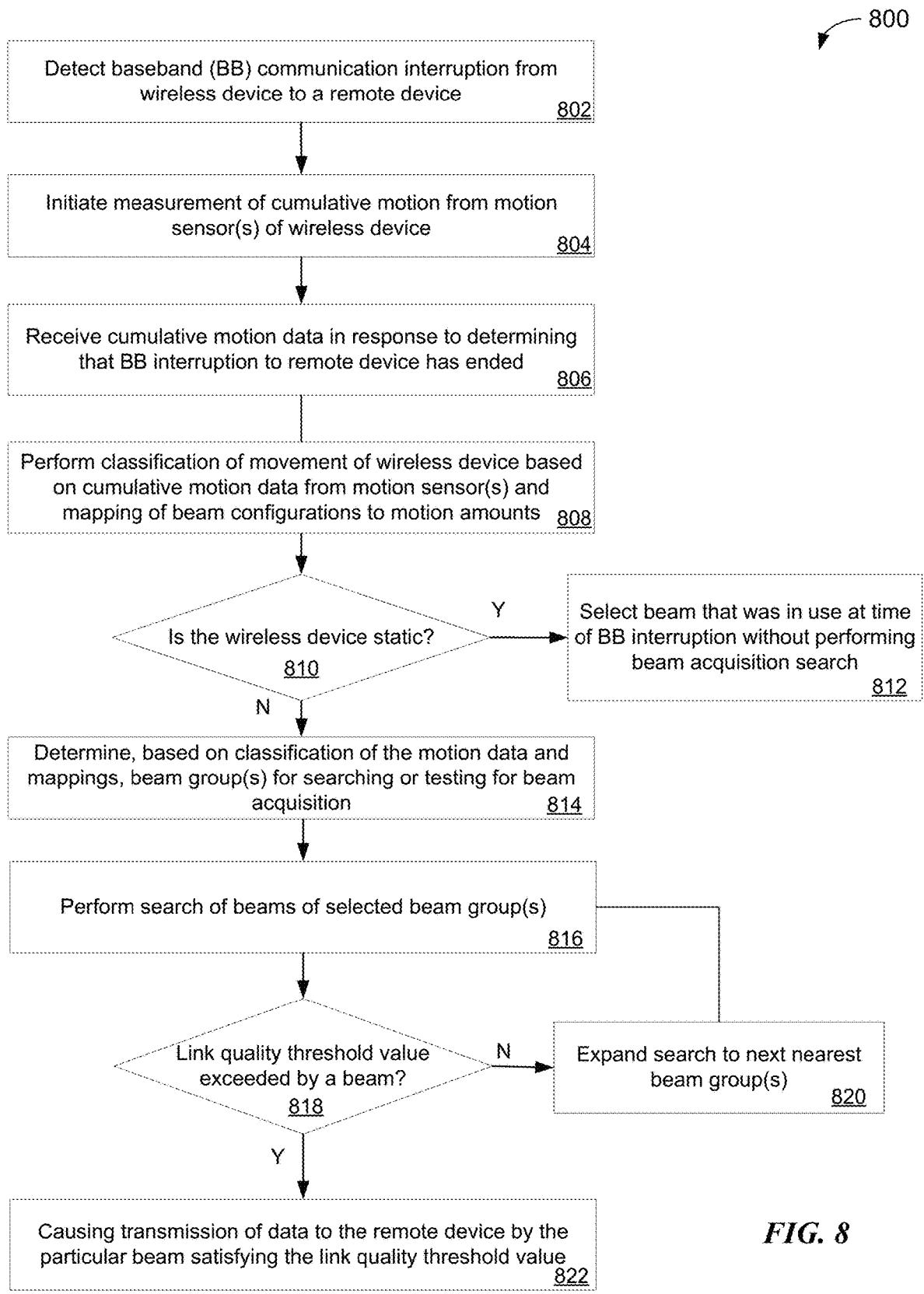
FIG. 8 illustrates an example of selection of a beam based on sensor feedback in accordance with some implementations of the present disclosure.

FIG. 8 illustrates an example process 800 for selection of a beam based on sensor feedback in accordance with some implementations of the present disclosure. In some examples, the electronic device(s), network(s), system(s), chip(s) or component(s), or portions or implementations thereof, of FIGS. 1-6 may be configured to perform the process 800. The process 800 includes detecting (802), by a wireless device, BB communication interruption form the wireless device to a remote device, such as a base station (e.g., gNB). The interruption can be detected directly (e.g., a UE switches to a second SIM in dual SIM operation). The interruption can be detected indirectly (e.g., a wireless device detects that the BB link is unavailable).

The process 800 includes, initiating measurement (804) motion data from one or more motion sensors coupled to a wireless device after detecting that a BB interruption is occurring. In some implementations, the sensors can include one or both of accelerometers and gyroscopes. Cumulative motion data are measured for the length of the BB interruption. A motion module (e.g., module 520 previously described) is configured to determine a total translation and rotation of the wireless device during the interruption. As previously described, the motion can be relative to a base station or to a beam direction.

The process 800 includes determining (806) that the BB interruption has ended. The motion module sends the motion data to the data processing system performing process 800. The process 800 includes classifying (808) the motion data. The classification includes determining how much the wireless device has moved during the BB interruption. The classification associates different amounts of movement with different beam groups.

The process includes determining (810) whether the wireless device is static or mobile during the BB interruption. If the wireless device is static during the interruption, the process 800 includes selecting (812) the beam that was being used prior to the BB interruption without performing a beam acquisition search. This enables rapid recovery of the mmWave link after the BB interruption is completed. If the wireless device is mobile, the process 800 includes determining (814), based on the classification of the movement, the beam group(s) to test during beam acquisition. The amount of rotation or translation indicates that a beam that is a given distance from the current beam (e.g., a wide beam) may be needed for reestablishing the mmWave link.

The process 800 includes performing (816) the search of the selected beams or beam groups. In some implementations, process 800 includes selecting the one or more respective thresholds by applying training data representing values of the one or more metrics to a machine learning model. The machine learning model is configured to classify the synchronization signal as blocked or unblocked.

The process 800 includes determining (818) if a link quality threshold is exceeded by any of the searched beams. If no searched beam exceeds threshold(s) for link quality, the process 800 includes expanding (820) the search to additional beam groups. In this example, beam groups further away from the current beam can be searched. The process is repeated until a suitable link is found that exceeds the quality threshold or until all beams are searched. The process 800 includes causing (822) transmission of data by the wireless device using the selected beam that satisfies link quality threshold(s).

In some embodiments, the process 800 includes determining an initial pose of the wireless device with respect to the remote device using angle of arrival (AoA) data. The pose of the wireless device relative to the remote device is based on the motion data indicative of the change in the position or the orientation of the wireless device from the initial pose.

In some embodiments, the one or more metrics include at least one of a signal to noise (SNR) ratio of the synchronization signal, a delay spread value of the synchronization signal, and a magnitude of a change in the AoA of the synchronization signal.

In some embodiments the wireless device and the remote device are configured for mmWave communication using frequency range 2 (FR2).

In some embodiments the wireless device comprises at least three antenna arrays, and wherein each antenna array includes a specified number of beam configurations that can be greater than 10.

In some embodiments determining, based on the motion data, the pose of the wireless device relative to the remote device includes determining one or more of a translational motion or a rotational motion of the wireless device exceeds a motion threshold. The process 800 includes, in response to determining that the motion threshold is exceeded, selecting a particular beam group for beam acquisition.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

EXAMPLES

In the following sections, further exemplary embodiments are provided.

Example 1 includes a method of operating a UE, the method comprising: obtaining motion data from one or more motion sensors coupled to a wireless device; determining, based at least on the motion data, that the wireless device is static relative to a remote device that is in communication with the wireless device using a beam generated by the wireless device; obtaining data representing one or more link metrics of the beam, the link metrics being associated with a period of time that the wireless device is static; determining, from the one or more link metrics, a link stability value associated with the beam, for the period of time that the wireless device is static; determining that the wireless device is out of coverage (OoC) with respect to the remote device based on the link stability value associated with the beam; in response to determining that the wireless device is OoC with respect to the remote device, selecting a first beam group including one or more first beams generated by the wireless device; determining, for each beam of the first beam group, a respective link stability value for the beam; selecting, based on the determining, a particular beam of the one or more first beams; and reestablishing communication with the remote device using the particular beam.

Example 2 includes a method of example 1 or some other example herein, wherein determining that the wireless device is out of coverage (OoC) with respect to the remote device based on the link stability value associated with the beam comprises: comparing the link stability value to a predetermined threshold value; and determining that the link stability value fails to satisfy the threshold value based on the comparing.

Example 3 includes the method of example 1 or some other example herein, wherein the threshold value is determined using a machine learning model trained with link metric data that are labeled as representing an unstable link of an OoC scenario or a stable link of a line of sight (LOS) scenario.

Example 4 includes the method of example 3 or some other example herein, wherein the link stability value represents a standard deviation of a link metric of the one or more link metrics.

Example 5 includes a method of example 1 or some other example herein, wherein the link stability value represents a minimum value of a link metric of the one or more link metrics.

Example 6 includes a method of example 1 or some other example herein, wherein the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

Example 7 includes a method of example 1 or some other example herein, wherein selecting a particular beam comprises selecting a first beam of the first beam group, associated with a respective link stability value that satisfies a threshold link stability value.

Example 8 includes the method of example 1 or some other example herein, wherein selecting a particular beam comprises determining that the first beam group does not include any beam that is associated with a link stability value satisfying a link stability threshold; in response to the determining, selecting a second beam group, wherein second beams of the second beam group are further from the beam than the first beams of the first beam group; and selecting a second beam from the second beam group.

Example 9 includes the method of example 1 or some other example herein, wherein the one or more motion sensors comprise at least an accelerometer or a gyroscope.

Example 10 includes the method of example 1 or some other example herein, wherein the wireless device and the remote device are configured for mmWave communication using frequency range 2 (FR2).

Example 11 includes the method of example 1 or some other example herein, the method further comprising retrieving the motion data periodically to determine if the wireless device is moving or is static.

Example 12 includes the method of example 1 or some other example herein, wherein the wireless device includes an antenna array including a specified number of configurations, and wherein selecting the particular beam comprises selecting one of the specified number of configurations. The specified number of beam configurations can include between 1-30 beam configurations per panel. In some implementations, there are more than 30 beam configurations per panel.

Example 13 includes a method of operating a UE, the method comprising: receiving, from one or more motion sensors of a wireless device, motion data indicative of a motion of the wireless device during an interruption to a baseband (BB) communication link between the wireless device and a remote device; retrieving a mapping of amounts of motion of the wireless device to corresponding beam groups of the wireless device; classifying the motion data as representing an amount of motion; based on the classifying, identifying at least one beam group of the mapping for performing beam acquisition; selecting, from the at least one beam group, a particular beam of the wireless device; and reestablishing communication with the remote device using the particular beam.

Example 14 includes the method of example 13 or some other example herein, the method further comprising detecting the interruption to the BB communication link; and initiating, in response to the detecting, a measurement of the motion of the wireless device during the interruption to the BB communication link, wherein the motion data represents a total motion of the wireless device during the interruption to the BB communication link.

Example 15 includes the method of example 13 or some other example herein, wherein classifying the motion data as representing the amount of motion comprises: determining that the wireless device has not moved during the interruption to the BB communication link; identifying, based on determining, an initial beam included in the at least one beam group being used when the interruption to the BB communication link is detected by the wireless device; and wherein the particular beam includes the initial beam.

Example 16 includes the method of example 15 or some other example herein, wherein the initial beam is selected independent of a beam acquisition process by the wireless device.

Example 17 includes the method of example 13 or some other example herein, wherein selecting the particular beam is based on one or more link metrics associated with each beam of the at least one beam group in a beam acquisition process.

Example 18 includes the method of example 13 or some other example herein, wherein the mapping of amounts of motion of the wireless device to corresponding beam groups comprises a relation of a particular amount of motion to a beam configuration entry in a beamforming codebook.

Example 19 includes the method of example 13 or some other example herein, wherein classifying comprises executing a machine learning model that is trained using labeled motion data.

Example 20 may include an apparatus comprising means to perform one or more elements of a method described in or related to any of examples 1-19, or any other method or process described herein.

Example 21 may include one or more non-transitory computer-readable media comprising instructions to cause an electronic device, upon execution of the instructions by one or more processors of the electronic device, to perform one or more elements of a method described in or related to any of examples 1-19, or any other method or process described herein.

Example 22 may include an apparatus comprising logic, modules, or circuitry to perform one or more elements of a method described in or related to any of examples 1-19, or any other method or process described herein.

Example 23 may include a method, technique, or process as described in or related to any of examples 1-19, or portions or parts thereof.

Example 24 may include an apparatus comprising: one or more processors and one or more computer-readable media comprising instructions that, when executed by the one or more processors, cause the one or more processors to perform the method, techniques, or process as described in or related to any of examples 1-19, or portions thereof.

Example 25 may include a signal as described in or related to any of examples 1-19, or portions or parts thereof.

Example 26 may include a datagram, information element, packet, frame, segment, PDU, or message as described in or related to any of examples 1-19, or portions or parts thereof, or otherwise described in the present disclosure.

Example 27 may include a signal encoded with data as described in or related to any of examples 1-19, or portions or parts thereof, or otherwise described in the present disclosure.

Example 28 may include a signal encoded with a datagram, IE, packet, frame, segment, PDU, or message as described in or related to any of examples 1-19, or portions or parts thereof, or otherwise described in the present disclosure.

Example 29 may include an electromagnetic signal carrying computer-readable instructions, wherein execution of the computer-readable instructions by one or more processors is to cause the one or more processors to perform the method, techniques, or process as described in or related to any of examples 1-19, or portions thereof.

Example 30 may include a computer program comprising instructions, wherein execution of the program by a processing element is to cause the processing element to carry out the method, techniques, or process as described in or related to any of examples 1-19, or portions thereof.

Example 31 may include a signal in a wireless network as shown and described herein.

Example 32 may include a method of communicating in a wireless network as shown and described herein.

Example 33 may include a system for providing wireless communication as shown and described herein.

Example 34 may include a device for providing wireless communication as shown and described herein.

What is claimed is:

1. A method, comprising:
    obtaining motion data from one or more motion sensors coupled to a wireless device;
    determining, based at least on the motion data, that the wireless device is static relative to a remote device that is in communication with the wireless device using a beam generated by the wireless device;
    obtaining data representing one or more link metrics of the beam, the one or more link metrics being associated with a period of time that the wireless device is static;
    determining, from the one or more link metrics, a link stability value associated with the beam, for the period of time that the wireless device is static;
    determining that the wireless device is out of coverage (OoC) with respect to the remote device based on the link stability value associated with the beam;
    in response to determining that the wireless device is OoC with respect to the remote device, selecting a first beam group including one or more first beams generated by the wireless device;
    determining, for each beam of the first beam group, a respective link stability value for the beam;
    selecting, based on the determining, a particular beam of the one or more first beams; and
    reestablishing communication with the remote device using the particular beam.

2. The method of claim 1, wherein determining that the wireless device is out of coverage (OoC) with respect to the remote device based on the link stability value associated with the beam comprises:
    comparing the link stability value to a predetermined threshold value; and
    determining that the link stability value fails to satisfy the predetermined threshold value based on the comparing.

3. The method of claim 2, wherein the predetermined threshold value is determined using a machine learning model trained with link metric data that are labeled as representing an unstable link of an OoC scenario or a stable link of a line of sight (LOS) scenario.

4. The method of claim 2, wherein the link stability value represents a standard deviation of a link metric of the one or more link metrics.

5. The method of claim 2, wherein the link stability value represents a minimum value of a link metric of the one or more link metrics.

6. The method of claim 1, wherein the one or more link metrics include at least one of a signal to noise (SNR) ratio of a signal received from the remote device, a delay spread value of the signal, a magnitude of a change in an angle of arrival (AoA) of the signal, or a reference signal received power (RSRP) of the signal.

7. The method of claim 1, wherein selecting a particular beam comprises selecting a first beam of the first beam group, associated with a respective link stability value that satisfies a threshold link stability value.

8. The method of claim 1, wherein selecting a particular beam comprises:
    determining that the first beam group does not include any beam that is associated with a link stability value satisfying a link stability threshold;
    in response to the determining, selecting a second beam group, wherein second beams of the second beam group are further from the beam than the first beams of the first beam group; and
    selecting a second beam from the second beam group.

9. The method of claim 1, wherein the one or more motion sensors comprise at least an accelerometer or a gyroscope.

10. The method of claim 1, wherein the wireless device and the remote device are configured for mmWave communication using frequency range 2 (FR2).

11. The method of claim 1, further comprising retrieving the motion data periodically to determine if the wireless device is moving or is static.

12. The method of claim 1, wherein the wireless device includes an antenna array including at least a specified number of beam configurations, and wherein selecting the particular beam comprises selecting one of the at least specified number of beam configurations.

13. One or more processors for a user equipment (UE), the one or more processors comprising:
    circuitry configured to communicate with a remote device; and
    circuitry to execute one or more instructions that, when executed, cause the one or more processors to perform operations comprising:
        obtaining motion data from one or more motion sensors coupled to a wireless device;
        determining, based at least on the motion data, that the wireless device is static relative to a remote device that is in communication with the wireless device using a beam generated by the wireless device;
        obtaining data representing one or more link metrics of the beam, the one or more link metrics being associated with a period of time that the wireless device is static;
        determining, from the one or more link metrics, a link stability value associated with the beam, for the period of time that the wireless device is static;
        determining that the wireless device is out of coverage (OoC) with respect to the remote device based on the link stability value associated with the beam;
        in response to determining that the wireless device is OoC with respect to the remote device, selecting a first beam group including one or more first beams generated by the wireless device;
        determining, for each beam of the first beam group, a respective link stability value for the beam;
        selecting, based on the determining, a particular beam of the one or more first beams; and
        reestablishing communication with the remote device using the particular beam.

* * * * *